United States Patent
Chang et al.

(12)

(10) Patent No.: US 6,296,727 B1
(45) Date of Patent: Oct. 2, 2001

(54) METHOD FOR ULTRASONICALLY SEALING A PLASTIC FILM COMPOSED OF POLYPROPYLENE

(75) Inventors: Eng-Pi Chang; Edward I. Sun, both of Arcadia, CA (US); Edward Podosek, Wilbraham, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/527,159

(22) Filed: Mar. 17, 2000

(51) Int. Cl.[7] ...................................................... B32B 31/16
(52) U.S. Cl. ..................... 156/73.1; 156/267; 156/290; 156/308.4
(58) Field of Search .................... 156/73.1, 73.3, 156/250, 267, 290, 308.2, 308.4, 553, 580.1, 580.2

(56) References Cited

U.S. PATENT DOCUMENTS 5,476,570 * 12/1995 Widmann ............................ 156/515
6,009,925 * 1/2000 Hall et al. ............................ 156/358

FOREIGN PATENT DOCUMENTS

4313875-C2 * 11/1994 (DE).
0622170-A2 * 2/1994 (EP).

* cited by examiner

Primary Examiner—James Sells
(74) Attorney, Agent, or Firm—Oppenheimer Wolff & Donnelly, LLP

(57) ABSTRACT

A method of making a cover comprising a pair of welded thermoplastic polymer sheets having therebetween a stiffener. A stiffener is provided such that the stiffener has a leading edge, a trailing edge, and two side edges. A pair of thermoplastic polymer sheets are positioned on opposite sides of the stiffener. The thermoplastic polymer sheets each have two side edges substantially parallel to the side edges of the stiffener. The thermoplastic polymer sheets are ultrasonically welded around the periphery of the stiffener. The polymer sheets are cut to form a leading edge and trailing edge which are substantially parallel to the leading edge and trailing edge of the stiffener. The thermoplastic polymer is typically selected from the group consisting of polypropylene and a copolymer of ethylene or butene and propylene, the weight percent of ethylene or butene being between about 1 wt. % to about 10 wt. %, and containing a sufficient amount of a nucleating agent to raise the recrystalization temperature to between about 100° C. to about 140° C.

11 Claims, 1 Drawing Sheet

METHOD FOR ULTRASONICALLY SEALING A PLASTIC FILM COMPOSED OF POLYPROPYLENE

I. BACKGROUND OF THE INVENTION

A. Field of the Invention

Figure 1:
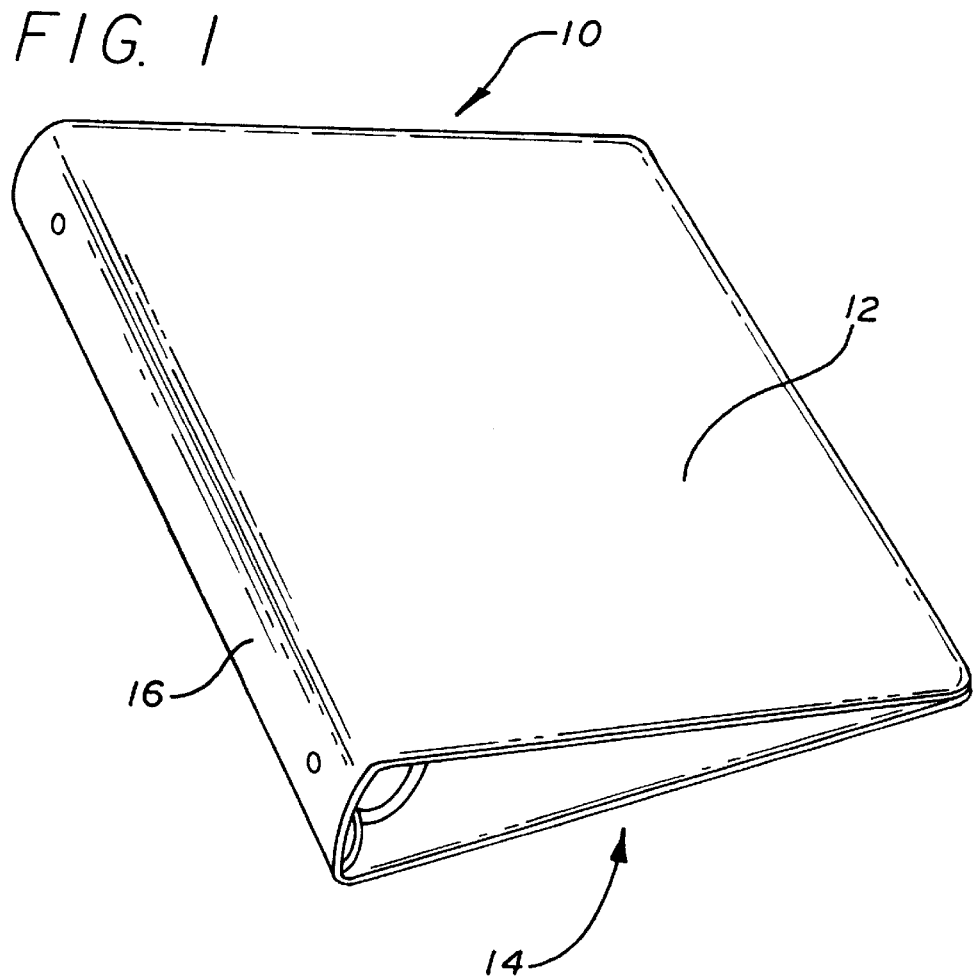

The present invention relates to binders and other articles of manufacture having sheets of plastic bonded together and, in particular, a method for ultrasonically sealing a plastic film during the manufacture of a binder.

B. Prior Art

The manufacturing process of polypropylene clear view binders involves ultrasonically sealing and cutting sheets of plastic at the edges of the binders. Waste material is then stripped away from the edge. U.S. Pat. No. 5,476,570, which issued on Dec. 19, 1995 to Widmann and which is incorporated by reference herein, discloses a method for manufacturing folders or binder jackets that utilizes ultrasonic welding.

An important aspect of a commercial binder manufacturing operation is the speed with which binders can be produced. While high rates of production are desired, production is typically limited by the need to ensure that the plastic sheets are well-sealed, that the cuts are clean, and that the edges are smooth after the waste material is stripped. In particular, problems that occur at high production rates of greater than about 20 binders per minute include ragged, bumpy edges, blemishes and stringiness.

There is therefore a need for an improved method of ultrasonically sealing a plastic film composed of polypropylene that can be performed at higher production rates and yield products that are free of defects such as ragged or bumpy edges, blemishes, or stringiness.

II. SUMMARY OF THE INVENTION

Broadly considered, the present invention relates to employing a nucleating agent to raise the recrystallization temperature of the plastic sheets from which office products such as binders are formed.

One aspect of the present invention is a method of making a cover comprising a pair of welded thermoplastic polymer sheets having therebetween a stiffener. A stiffener is provided such that the stiffener has a leading edge, a trailing edge, and two side edges. The stiffener may be made of any suitable stiffening material such as clipboard or fiberboard. A pair of thermoplastic polymer sheets are positioned on opposite sides of the stiffener. The thermoplastic polymer sheets each have two side edges substantially parallel to the side edges of the stiffener. The thermoplastic polymer sheets are ultrasonically welded around the periphery of the stiffener. The polymer sheets are cut to form a leading edge and trailing edge which are substantially parallel to the leading edge and trailing edge of the stiffener. A cover is then formed thereby in which the two thermoplastic polymer sheets have substantially the same length and width as the stiffener.

The thermoplastic polymer is selected from the group consisting of polypropylene and a copolymer of ethylene or butene and propylene, the weight percent of ethylene or butene being between about 1 wt. % to about 10 wt. %, and containing a sufficient amount of a nucleating agent to raise the recrystallization temperature to between about 100° C. to about 140° C.

Embodiments of this aspect of the invention may include additional features. The amount of nucleating agent present in the thermoplastic polymer may be between about 0.05% and about 1% by weight.

The nucleating agent may be selected from the group consisting of mineral nucleating agents, salts of aliphatic acids, aralkyl acids, and sorbitol derivatives. The nucleating agent may alternatively be a compound selected from the group consisting of benzylidene sorbitol and bis (alkylbenzylidene) sorbitol wherein the alkyl moiety has from 2 to 18 carbon atoms.

The thermoplastic polymer sheet containing the nucleating agent is typically stiffer than the thermoplastic polymer sheet without the nucleating agent as shown by the Gurley stiffness in the following Table 1, where the Gurley stiffness is the average of the stiffness measured in the machine direction (MD) and in the cross-direction (CD). Generally speaking, the Gurley stiffness will be between about 350 or 400 and 525 or 550.

Gurley stiffness is determined by T 543 pm-84. As is known in the art, the Gurley stiffness tester consists of a balanced pendulum or pointer, pivoted at its center of gravity, mounted in jewel bearings and provided with holes for attaching weights at one inch, two inches and four inches below the center pivot. In practice, the sample to be measured is centrally clamped to the tester. A suitable weight is attached in one of the three positions, giving arm ratios of 4 to 5, 2 to 5, or 1 to 5. The control switch is pressed to drive the arm carrying the clamped sample. The test is completed when the end of the sample clears the vane.

The melt flow index of the thermoplastic polymer sheets may be between about 1 and 10. The melting point of the thermoplastic polymer sheet may be between about 130° C. to about 170° C.

One or more stiffeners may be provided to define a front cover stiffening panel, a spine stiffening panel and a rear cover stiffening panel.

Other objects and features of the invention will become apparent from a review of the Detailed Description below, from the drawings, and from the claims.

III. BRIEF DESCRIPTION OF THE DRAWINGS

Figure 2:
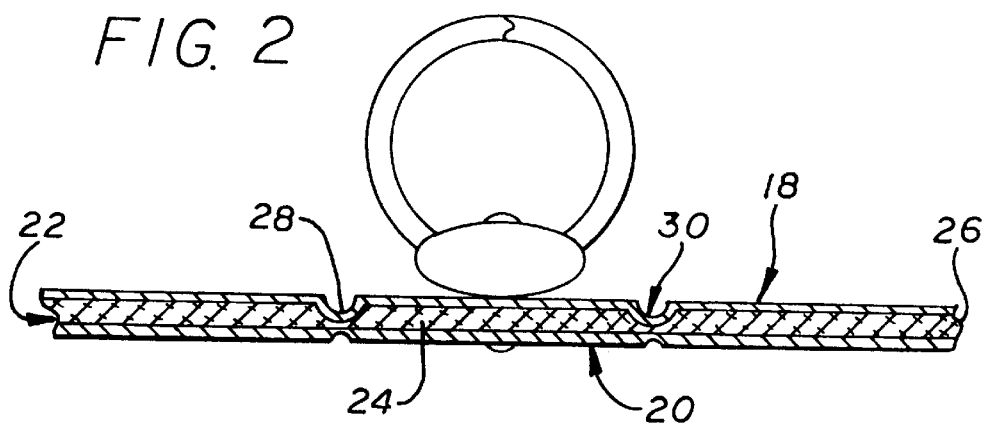

FIG. 1 illustrates a binder incorporating stiffeners in the front panel, back panel, and the spine; and FIG. 2 is a cross-sectional view of the binder of FIG. 1.

IV. DETAILED DESCRIPTION OF THE PREFERRED EMBODIMENT

One aspect of the present invention is a method for making a cover comprising a pair of welded thermoplastic polymer sheets having therebetween a stiffener, said method comprising the steps of:

(1) providing a stiffener having a leading edge, a trailing edge and two side edges and defining a cover;

(2) positioning a pair of thermoplastic polymer sheets on opposite sides of said stiffener; said thermoplastic polymer sheets each having two side edges substantially parallel to the side edges of said stiffener, the thermoplastic polymer being selected from the group consisting of polypropylene and a copolymer of ethylene or butene and propylene, the weight percent of ethylene or butene being between about 1 wt. % to about 10 wt. %, and containing a sufficient amount of a nucleating agent to raise the recrystallization temperature to between about 100° C. to about 140° C.;

(3) ultrasonically welding together said thermoplastic polymer sheets around the periphery thereof; and (4) cutting said polymer sheets to form a leading edge and trailing edge of the thermoplastic polymer sheets which are substantially parallel to the leading edge and trailing edge of said stiffener and to form a cover in which the two thermoplastic polymer sheets have substantially the same length and width as the stiffener.

The thermoplastic polymer can be polypropylene or a copolymer of ethylene or butene and propylene. If the thermoplastic polymer is a copolymer, the copolymer preferably contains from about 1% to about 10% of ethylene or butene by weight.

The ultrasonic may be done with the apparatus and using the method described in U.S. Pat. No. 5,476,570 wherein the apparatus has eight welding horns located below the polymer sheets.

It is necessary to utilize a nucleating agent to modify the crystal structure and provide a large number of considerably smaller crystals or spherulites to raise the recrystalisation temperature and improve the transparency (clarity), stiffness, and the die-cuttability of the film. The use of the nucleating agent raises the recrystallization temperature of the thermoplastic polymer to a value from about 100° C. to about 140° C. Obviously, the amount of nucleating agent added to the film formulation should not have a deleterious effect on the clarity of the film. Nucleating agents which have been used heretofore for polymer films include mineral nucleating agents and organic nucleating agents.

Examples of mineral nucleating agents include silica, kaolin and talc.

Among the organic nucleating agents which have been suggested as useful in polyolefin films include salts of aliphatic mono-basic or di-basic acids or aralkyl acids such as sodium succinate, sodium glutarate, sodium caproate, sodium 4-methylvalerate, aluminum phenyl acetate, and sodium cinnamate, as well as homologues, analogues, and derivatives of these acids. Other salts such as potassium salts can alternatively be used. Alkali metal and aluminum salts of aromatic and alicyclic carboxylic acids such as aluminum benzoate, sodium or potassium benzoate, sodium beta-naphthoate, lithium benzoate and aluminum tertiary-butyl benzoate also are useful organic nucleating agents. Substituted sorbitol derivatives such as bis (benzylidene) and bis (alkylbenzylidene) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-paramethylbenzylidene sorbitol, and 1,3,2,4-di-paraethylbenzylidene sorbitol are effective nucleating agents for polypropylenes. Useful nucleating agents are commercially available from a number of sources. Millad 8C-41-10 (a concentrate containing about 10 wt. % Millad 3988 and 90 wt. % random copolymer of propylene and 3.2 wt. % ethylene), Millad 3988 and Millad 3905 are sorbitol nucleating agents available from Milliken Chemical Co. Derivatives, analogues, and homologues of these sorbitol derivatives can also be used as nucleating agents.

The amounts of nucleating agent incorporated into the film formulations of the present invention are generally quite small and range from about 500 to about 10,000 ppm of the total stock (i.e., from about 0.05% to about 1% by weight of the film formulation).

Typically, the Gurley stiffness of the nucleated thermoplastic polymer sheet is between about 150 to 450. Preferably, the Gurley stiffness is between about 200 to about 400.

Preferably, the melt flow index of the thermoplastic polymer sheets is between about 1 and 10.

Preferably, the melting point of the nucleated thermoplastic polymer sheet is between about 140° C. to about 160° C.

In one alternative of the method, one or more stiffeners are provided defining a front cover stiffening panel, a spine stiffening panel and a rear cover stiffening panel. An example of this arrangement is shown in a binder in FIGS. 1 and 2. The binder 10 includes front and back cover panels 12 and 14, respectively, and a spine 16. The front and back cover panels 12 and 14 and the spine 16 are formed of an inner sheet 18 and an outer sheet 20. Between the inner sheet 18 and the outer sheet 20 are located a front cover stiffening panel 22, a spine stiffening panel 24, and a back cover stiffening panel 26. The front and back cover panels 12 and 14 and the spine 16 are joined by hinges 28 and 30.

The thermoplastic polymer sheets can further include a pigment or colorant. One suitable pigment is titanium dioxide.

The invention is illustrated by the following Examples. These Examples are for exemplification only and are not intended to limit the invention.

EXAMPLES

Example 1

This formulation contained 0.2 wt. % of a nucleating agent 1,3,2,4-dibenzylidene sorbitol known as Millard 8C41, and Union Carbide 6D81 ethylenepropylene copolymer having 5.7 wt. % ethylene.

Example 2

This formulation is identical to Example 1 except it did not contain a nucleating agent.

Example 3

Binders were produced using standard binder production machinery as exemplified in U.S. Pat. No. 5,476,570. The ultrasonic welding was done at a temperature of about 350° F. using eight welding horns (sonotrodes).

Example 4

The physical properties of binders produced in accordance with Example 3, using films set out in Examples 1 and 2 are set forth in Table 1.

TABLE 1

| Film | Speed (sheets/minute) | Gurley Stiffness/mg. (Ave. of MD & CD) | Recrystallization Temperature | Melting Point (Temp. ° C.) | Melt Index |
|---|---|---|---|---|---|
| Example 1 | 24 | 387 | 103.6 | 144.6 | 5 |
| Example 2 | 19 | 272 | 95 | 133 | 5 |

Other formulations which produced good results include a copolymer of propylene and 3.2 wt. % ethylene with 0.2 wt. % 1,3,2,4-dibenzylidene sorbitol and polypropylene.

ADVANTAGES OF THE INVENTION

The present invention describes an improved process for producing articles such as covers or binders in which a pair of welded thermoplastic polymer sheets are used. The method of the present invention provides high quality product while increasing the rate of production. The resulting articles are substantially free from defects such as ragged edges, bumps, or blemishes.

The foregoing has described presently preferred embodiments of the invention, as well as alternative embodiments. However, it should be understood that the scope of the invention is not limited to what is described in the Specification. Numerous variations may be employed within the scope of the invention.

Accordingly, the present invention is not limited precisely to the arrangements as described in detail hereinabove.

What is claimed is:

1. A method of making a cover comprising a pair of welded thermoplastic polymer sheets having therebetween a stiffener, said method comprising the steps of:

(a) providing a stiffener having a leading edge, a trailing edge and two side edges and defining a cover;

(b) positioning a pair of thermoplastic polymer sheets on opposite sides of said stiffener; said thermoplastic polymer sheets each having two side edges substantially parallel to the side edges of said stiffener, the thermoplastic polymer being selected from the group consisting of polypropylene and a copolymer of ethylene or butene and propylene, the weight percent of ethylene or butene being between about 1 wt. % to about 10 wt. %, and containing a sufficient amount of a nucleating agent to raise the recrystalization temperature to between about 100° C. to about 140° C.;

(c) ultrasonically welding together said thermoplastic polymer sheets around the periphery thereof; and (d) cutting said polymer sheets to form a leading edge and trailing edge of the thermoplastic polymer sheets which are substantially parallel to the leading edge and trailing edge of said stiffener and to form a cover in which the two thermoplastic polymer sheets have substantially the same length and width as the stiffener;

(e) the thermoplastic polymer being a member selected from the group consisting of polypropylene and a copolymer of ethylene or butene and propylene, the weight percent of ethylene or butene being between about 1 wt. % to about 10 wt. %, and containing a sufficient amount of a nucleating agent to raise the recrystalization temperature to between about 100° C. to about 140° C.

2. A method according to claim 1 wherein the amount of nucleating agent present in the thermoplastic polymer is between about 0.05% and about 1% by weight.

3. A method according to claim 2 wherein the thermoplastic polymer is a copolymer of ethylene and propylene.

4. A method according to claim 1 wherein the nucleating agent is selected from the group consisting of mineral nucleating agents, salts of aliphatic acids, arylalkyl acids, and sorbitol derivatives.

5. A method according to claim 4 wherein the nucleating agent is a sorbitol derivative.

6. A method according to claim 5 wherein the nucleating agent is a member selected from the group consisting of benzylidene sorbitol and bis(alkylbenzilidine)sorbitol wherein the alkyl has from 2 to 18 carbon atoms.

7. A method according to claim 1 wherein the Gurley stiffness of the nucleated thermoplastic polymer sheet is between about 150 to 450.

8. A method according to claim 7 wherein the Gurley stiffness of the nucleated thermoplastic polymer sheet is between 250 to 400.

9. A method according to claim 1 wherein the melt flow index of the thermoplastic polymer sheets is between about 1 and 10.

10. A method according to claim 1 wherein the melting point of the nucleated thermoplastic polymer sheet is between about 140° C. to about 160° C.

11. A method of making a ring binder according to claim 1 wherein one or more stiffeners are provided defining a front cover stiffening panel, a spine stiffening panel and a rear cover stiffening panel.

* * * * *